US009335556B2

(12) United States Patent
Travis

(10) Patent No.: US 9,335,556 B2
(45) Date of Patent: May 10, 2016

(54) VARIABLE FOCAL BACKLIGHTING

(71) Applicant: Microsoft Corporation, Redmond, WA (US)

(72) Inventor: Adrian Travis, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 14/476,896

(22) Filed: Sep. 4, 2014

(65) Prior Publication Data

US 2016/0070113 A1    Mar. 10, 2016

(51) Int. Cl.
*G02F 1/1335* (2006.01)
*G02B 27/28* (2006.01)
*F21V 8/00* (2006.01)
(Continued)

(52) U.S. Cl.
CPC ............ *G02B 27/286* (2013.01); *G02B 6/0046* (2013.01); *G02B 6/0053* (2013.01); *G02B 6/0056* (2013.01); *G02F 1/13338* (2013.01); *G02F 1/13363* (2013.01);
(Continued)

(58) Field of Classification Search
CPC .......... G02F 1/13473; G02F 2203/055; G02F 1/13363; G02F 2001/133638; G02F 1/133615; G02F 1/133603; G02F 1/133604; G02F 1/133528; G02F 1/133526; G02B 27/088; G02B 6/0068; G02B 6/0038; G02B 5/3033
USPC ......................................... 349/61, 65, 18, 96
See application file for complete search history.

(56) References Cited

U.S. PATENT DOCUMENTS 7,331,682 B2 *  2/2008  Lee ...................... G02B 6/0023
                                                    359/489.09
7,909,958 B2    3/2011  Washburn et al.
(Continued)

FOREIGN PATENT DOCUMENTS

| GB | 2306741 A | 5/1997 |
|----|-----------|--------|
| WO | 9922268 | 5/1999 |
| WO | 2004104664 | 12/2004 |

OTHER PUBLICATIONS

Kasianova et al, "New Transparent Birefringent Material for Interference Polarizer Fabrication", In 15th International Symposium on Advanced Display Technologies, Jun. 11, 2007, 2 pages, vol. 6637.
(Continued)

*Primary Examiner* — Mike Qi
(74) *Attorney, Agent, or Firm* — Brandon Roper; Judy Yee; Micky Minhas

(57) ABSTRACT

A backlight unit includes a waveguide assembly having a first wedge and a birefringent wedge disposed adjacent to, and arranged nose-to-tail with, the first wedge, to define an interface of the waveguide assembly. The birefringent wedge has different indices of refraction for light propagating through the waveguide assembly in first and second polarization states. The first wedge is configured to propagate the light in the second polarization state at a different speed than the birefringent wedge. A liquid crystal layer is configured to selectively switch the light between the first and second polarization states. An extraction grating is configured to extract the light from the waveguide assembly at an emission angle established in accordance with an angle of incidence of the light on the extraction grating determined by an extent to which the light encountered the interface while propagating through the waveguide assembly in the second polarization state.

20 Claims, 7 Drawing Sheets

(51) Int. Cl.
*G02F 1/1333* (2006.01)
*G02F 1/13363* (2006.01)
*G09G 3/34* (2006.01)

(52) U.S. Cl.
CPC . *G09G 3/3406* (2013.01); *G02F 2001/133638* (2013.01); *G09G 2330/021* (2013.01)

(56) References Cited

U.S. PATENT DOCUMENTS

| | | |
|---|---|---|
| 8,152,306 B2 | 4/2012 | Liu et al. |
| 8,456,514 B2 | 6/2013 | Leister |
| 8,477,261 B2 | 7/2013 | Travis et al. |
| D705,246 S | 5/2014 | Ranz et al. |
| 2007/0014020 A1 | 1/2007 | Bourdelais et al. |
| 2010/0302798 A1 | 12/2010 | Papakonstantinou et al. |
| 2011/0221998 A1* | 9/2011 | Adachi ............... G02B 6/0036 349/62 |
| 2012/0299808 A1 | 11/2012 | Lee et al. |

OTHER PUBLICATIONS

U.S. Appl. No. 13/891,971, Travis, Adrian, "Phase Control Backlight", filed May 10, 2013.
U.S. Appl. No. 14/224,850, Travis, Adrian, "Scanning Liquid-Crystal Display Backlight", filed Mar. 25, 2014.
"International Search Report & Written Opinion Issued in PCT Application No. PCT/US2015/048219", Mailed Date: Dec. 7, 2015, 11 Pages.

* cited by examiner

VARIABLE FOCAL BACKLIGHTING

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
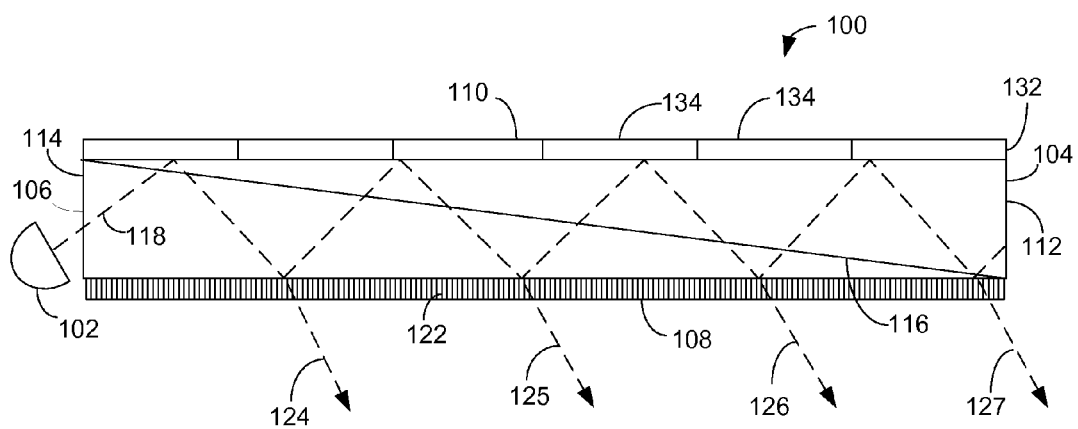
FIG. 1 is a schematic view of a backlight unit configured for variable convergence of backlight illumination in accordance with one example.

While the disclosed devices, systems and methods are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Display modules may include a display, for example, a liquid crystal display, a backlight unit, and other components. Displays and backlight units may be configured for variable convergence of backlight illumination. With variable convergence, the displays are capable of controlling the angles at which the rays of the backlight illumination converge. Controlling the angles at which the backlight illumination converges allows the illumination to be focused at an appropriate distance from the display. The appropriate distance may correspond with the pupil location(s) of the viewer(s) of the display. The illumination may thus be concentrated at the pupil locations rather than at other, non-relevant distances. The displays may thus avoid emitting light not received by the pupils of a viewer. To these ends, the pupil locations may be tracked as the pupils move, for instance, forward and backward, as well as from left to right. The convergence of the backlight illumination is varied as the pupil locations change. As a result, less light is wasted. Lowering the amount of wasted light may thus reduce power consumption.

The convergence of the backlight illumination is varied via a waveguide assembly having a birefringent wedge disposed in a nose-to-tail arrangement with another wedge. The other wedge may be an isotropic wedge or other wedge that propagates light at a different speed than the birefringent wedge for at least one polarization state. In some cases, the other wedge may be a birefringent wedge of the same or different material as the other birefringent wedge. If the two birefringent wedges are composed of the same material, then the wedges are configured such that the axes of birefringence are orthogonal to one another.

A liquid crystal layer is disposed adjacent the waveguide assembly to selectively switch the polarization state of the light reflectively propagating down the waveguide assembly. Switching the polarization state is used to control the extent to which a given ray of the light is refracted at the interface between the wedges. Selectively controlling the refraction is used to control the path taken by a ray within the waveguide assembly, which, in turn, establishes a range of angles at which rays of the light are emitted from the backlight unit. The range of angles may be adjusted to vary the distance at which the illumination converges. The distance at which the illumination is focused may thus be varied as the pupil location changes.

The backlight units may also adjust the directionality of the backlight illumination. For instance, the focus of the backlight illumination may be adjusted laterally as the pupil location(s) move left to right. The directionality of the illumination may be adjusted by controlling the angle at which the light is injected into the waveguide assembly. The illumination may thus be steered in addition to varying the angles at which the illumination converges. Power savings may thus be achieved by adjusting the directionality of the illumination focus.

The power consumption of a backlit display may be greatly reduced through configuring the illumination to include only those rays that travel to the eyes of the viewer. A flat panel display may use as much as one-third to one-half of the total power consumed by an electronic device. The backlight unit of the display may be responsible for about as much as 80% of that amount. The power savings may thus be useful in connection with battery-powered devices, such as mobile phones, smartphones, tablets, wearable devices—including wrist-worn devices and head-mounted devices—and laptop computers. Focusing the illumination may allow the display to emit less total light for given ambient conditions. Focusing the illumination may also increase the ability of the backlight unit to make the display viewable in bright ambient conditions. A highly emissive backlight may be provided without consumption of excessive power. The fraction of the overall power budget for handheld, wearable, and other small devices dedicated to the display may thus be reduced. The size and weight of the batteries used in such devices may be reduced accordingly. Alternatively or additionally, the devices may be operated with less frequent recharges. The reduction in power consumption may, in turn, reduce unwanted device heating.

Although useful in connection battery-powered devices, the backlight units and displays may be used with a wide variety of electronic devices. Examples of other devices include desktop computers and televisions. The size of the display may thus vary. Any electronic device having an image-forming liquid crystal display (LCD) or other backlit display may benefit from the variable convergence and other steering.

The variable convergence of the backlight illumination may be useful in ways in addition to those related to power savings. For instance, the variable convergence may be useful in connection with providing three-dimensional (3D) displays. Through variable convergence, one image may be focused on one pupil, while another image is focused on the other pupil.

Figure 2:
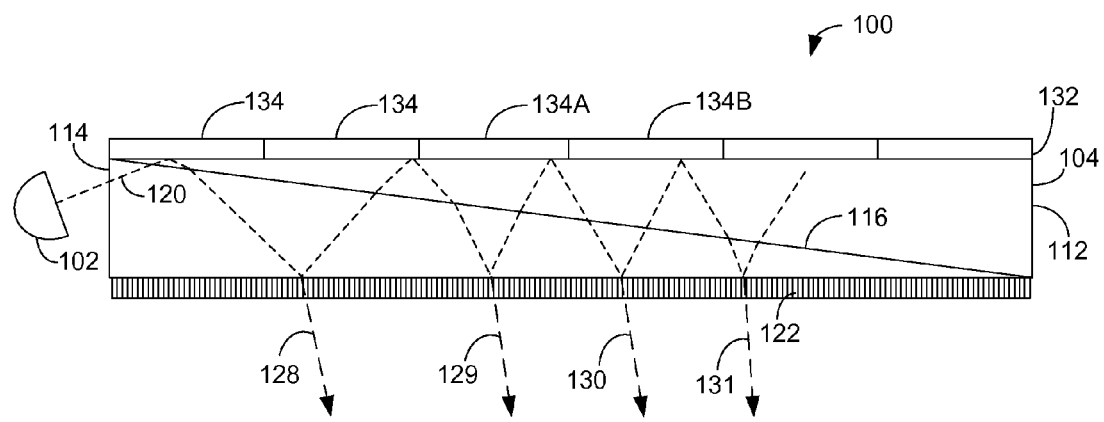
FIG. 2 is a schematic view of the backlight unit of FIG. 1 after adjustment of an extent to which the backlight illumination is converging in accordance with one example.

FIGS. 1 and 2 depict a backlight assembly 100 configured in accordance with one example. The backlight assembly 100 may be used to illuminate a liquid crystal display (LCD). For example, the backlight assembly 100 may be disposed behind an image-forming LCD panel of a display. The components, configuration, and other characteristics of the display may vary. For example, the display may be configured as a 3D display.

The backlight assembly 100 includes a light source 102 and a waveguide assembly 104 into which light from the light source 102 is injected. In this example, the light source 102 is disposed at an end 106 of the waveguide assembly 104. The end 106 of the waveguide assembly 104 is disposed between a front face 108 and a rear face 110 of the backlight assembly 100. The light source 102 may be disposed at the end opposite the end 106. Light extracted from the waveguide assembly 104 is emitted through the front face 108 of the backlight assembly 100. Other components of the display, such as the image-forming LCD panel, may be disposed along or otherwise in front of the front face 108.

The light source 102 may include one or more lasers, light emitting diode (LED) devices, or other types of light-generating devices. The light source 102 may generate linearly polarized light and/or include a linear polarizer. The light may be generated at one wavelength, multiple wavelengths, or across one or more ranges of wavelengths. Alternatively, multiple light-generating devices may be used to provide light of multiple colors (e.g., red, green, and blue). In multiple wavelength examples (e.g., with the light source 102 generating white light), the light source 102 may include one or more gratings configured to reverse or otherwise compensate for chromatic aberration introduced in connection with diffraction out of the waveguide assembly 104.

The light source 102 may be controlled to adjust the angle at which the light is injected into the waveguide assembly 104. In some cases, the light source 102 includes one or more adjustable mirrors and/or other optical components to adjust the injection angle. The configuration, construction, and other characteristics of the light source 102 may vary. For example, the manner in which the injection angle is adjusted may vary.

The waveguide assembly 104 includes a pair of wedges 112, 114 disposed adjacent to one another in a nose-to-tail arrangement. In the example of FIGS. 1 and 2, the thicker end of the wedge 112 is disposed at the end 106 of the waveguide assembly 104 with the thinner end of the wedge 114. The wedges 112, 114 may or may not be identically shaped. For example, the wedges 112, 114 may be shaped differently at the end of the waveguide assembly 104 opposite the end 106.

The nose-to-tail arrangement defines an interface 116 between the wedges 112, 114. The interface 116 may be descending or ascending as the light propagates down the waveguide assembly 104. For example, the slope of the interface 116 may vary based on the end 106 at which the light source 102 is disposed. Alternatively or additionally, the relative positions of the wedges 122, 114 and/or the front and rear faces 108, 110 may be swapped.

The wedges 112, 114 are configured such that refraction may occur at the interface 116. The extent to which refraction occurs as the light propagates down the waveguide assembly 104 is dependent upon the polarization state of the light. At least one of the two wedges 112, 114 is composed of a birefringent material to establish this dependency. The birefringent material has two different refractive indices depending on the polarization of the light and the axis of birefringence of the respective wedge 112, 114. For instance, the refractive index may differ for light linearly polarized in, e.g., a vertical direction (vertical polarization) from light linearly polarized in, e.g., a horizontal direction (horizontal polarization). Examples of suitable birefringent materials include polymerized liquid crystal materials. In one example, the refractive indices of the birefringent material are about 1.5 and about 1.8, but other refractive indices may be used. As a result of the birefringence, light propagating through the respective wedge 112, 114 travels at one of two different speeds depending upon the polarization state of the light.

In the example of FIGS. 1 and 2, the wedge 114 is composed of a birefringent material. The wedge 114 thus has different indices of refraction and, thus, different propagation speeds, for light propagating in two orthogonal polarization states.

The wedge 112 is configured to propagate light in at least one of the two orthogonal polarization states at a different speed than the birefringent wedge 114. In some cases, the wedges 112, 114 are composed of different materials to establish the different speeds. For example, the wedge 112 may be composed of an isotropic material. In such cases, the refractive index of the wedge 112 is thus not dependent upon the polarization state of the light propagating through the waveguide assembly 104. Examples of suitable isotropic materials include poly methyl methacrylate and other transparent materials. In one example, the refractive index of the isotropic material is about 1.5, but other refractive indices may be used. The refractive index of the isotropic material may be equal to or about equal to one of the refractive indices of the birefringent material of the wedge 114.

The wedge 112 may alternatively be composed of a birefringent material. In some cases, different birefringent materials are used in the wedges 112, 114. In these cases, one or both of the refractive indices of the wedge 112 may differ from the refractive indices of the material used for the wedge 114. For example, the light of one orthogonal polarization state may travel faster if the light were in the orthogonal polarization state in one wedge and slower than if the light were in the orthogonal polarization state in the other wedge. In other cases, the wedges 112, 114 are composed of the same birefringent material. In such cases, the wedges 112, 114 may be oriented or configured such that the respective axes of birefringence of the wedges 112, 114 are orthogonal to one another. Notwithstanding the option to use a birefringent wedge for the wedge 112, the wedge 112 may be referred to hereinafter as an isotropic wedge for ease in description.

At least one of the refractive indices of the birefringent material is offset from the refractive index of the isotropic wedge 112. In the examples of FIGS. 1 and 2, one of the refractive indices of the birefringent wedge 114 matches the refractive index of the isotropic material (i.e., the isotropic refractive index). As a result, when the light has the polarization state corresponding with the matching refractive index (e.g., vertical polarization), the light does not undergo refraction at the interface 116. FIG. 1 depicts an exemplary ray 118 of light having a polarization state for which the refractive indices of the wedges 112, 114 are matching. No refraction occurs at the interface 116, and the ray 118 of light propagates down the waveguide assembly 104 with unvarying reflection angles.

The polarization states may correspond with s-polarization and p-polarization. Other polarization states may be used. For example, various polarization orientations may be used. For instance, the states may be indicative of other pairs of orthogonal linear polarizations (e.g., oriented along diagonals).

FIG. 2 depicts an exemplary ray 120 of light having the other polarization state (e.g., horizontal polarization). In this state, the ray 120 experiences a refractive index of the birefringent material offset (e.g., substantially offset) from the isotropic refractive index. For example, the effective refractive index of the birefringent wedge 114 may be about 1.8, while the refractive index of the isotropic wedge 112 may be about 1.5. The ray 120 thus undergoes refraction at each crossing of the interface 116 so long as the polarization state remains unchanged. In that state, the ray 120 travels through the waveguide assembly 104 as if encountering a series of prisms. With each encounter, the angle of propagation gradually diverges from the normal to the boundary of the waveguide assembly 104.

In other cases, both of the refractive indices of the birefringent material are offset from the isotropic refractive index. One of the refractive indices of the birefringent material is more offset from the isotropic refractive index than the other refractive index of the birefringent material is offset from the isotropic refractive index. In one example, one of the refractive indices of the birefringent material does not exactly match the isotropic refractive index. For instance, the refractive index for horizontally polarized light may be near, but not equal to, the isotropic refractive index. In such cases, the horizontally polarized light may thus be slightly refracted, while vertically polarized light is more refracted (e.g., substantially more refracted). In still other examples, neither of the refractive indices of the birefringent material is near the isotropic refractive index. The light may thus undergo substantial or significant refraction at the interface 116 regardless of polarization state. But the amount of refraction is still dependent upon the polarization state in such cases.

With reference to FIGS. 1 and 2, the backlight assembly 100 includes an extraction grating 122 to extract light from the waveguide assembly 104. The extraction grating 122 is configured to frustrate the total internal reflection (TIR) that would otherwise cause all of the light to propagate down the waveguide assembly 104 until reaching the end opposite from the end 106. The pitch of the extraction grating 122 may be sufficiently short such that, once the light leaves the first order, the light is forced to leave the waveguide assembly 104 at a specific angle. The extraction grating 122 extends laterally along the waveguide assembly 104. For example, the extraction grating 122 may extend the entire length (and/or width) of the waveguide assembly 104. The extraction grating 122 may be configured to vary the amount of extraction as a function of lateral position along the length of the waveguide assembly 104. The extraction amount may increase with the distance from the light source 102 so that the light may be uniformly extracted from the waveguide assembly 104. The amount of extraction may be increased to ensure that all or substantially all of the light is diffracted out of the waveguide assembly 104 as the light reaches the end of the waveguide assembly 104.

In the example of FIGS. 1 and 2, the extraction grating 122 is disposed along the birefringent wedge 114. The extraction grating 122 is alternatively disposed along the isotropic wedge 112. In this example, the extraction grating 122 is configured as a layer or film adjacent to (e.g., contiguous with) the waveguide assembly 104. The extraction grating 122 may be embossed, bonded or otherwise secured to the waveguide assembly 104. The structure, configuration, or other characteristics of the extraction grating 122 may vary. For example, a surface ripple with an amplitude of about 0.1 microns and a pitch of 2.4 ripples per micron may be used as the extraction grating 122, but the amplitude and pitch may vary. In other cases, the extraction grating 122 is formed on or in the waveguide assembly 104. The extraction grating 122 may be recorded in the film, layer, or waveguide assembly 104 as a Bragg grating or other volume hologram, but other types of gratings may be used.

Light is extracted by the extraction grating 122 at an emission angle established in accordance with an angle of incidence of the light on the extraction grating 122. For example, in FIG. 1, a set of parallel rays 124-127 are emitted because the angle of incidence remains the same. Each ray 124-127 may be diffracted at the interface with the extraction grating 122 as shown. The interface may, for example, be an air interface. But the amount of diffraction is the same for each ray 124-127. The rays 124-127 accordingly remain parallel.

In contrast, in FIG. 2, a set of converging rays 128-131 are emitted. The rays 128-131 are converging because of the refraction occurring when the ray 120 crosses the interface 116 within the waveguide assembly 104. The refraction changes the angle of incidence of the ray 120 on the extraction grating 122. The refraction also changes the angle at which the rays 128-131 are emitted (i.e., the emission angle) because the emission angle is established in accordance with the angle of incidence. The emission angle may be defined relative to the direction normal to the surface of the backlight assembly 100. As the number of refractions at interface crossings increases, the emission angle is decreasing. The extent to which the emission angle decreases is determinative of the rate at which the rays 128-131 are converging.

The angle of incidence and, thus, the emission angle are determined by an extent to which the ray 120 encounters the interface 116 while propagating through the waveguide assembly 104 in the polarization state for which the refractive index of the birefringent material is offset (or most offset) from the isotropic refractive index. With each encounter of the interface 116 in that polarization state, the emission angle is changed. The amount of refraction and, thus, the extent to which the emission angles change, may be less dramatic than as shown in FIG. 1. The drawings may exaggerate the amount of refraction for ease in illustration. In practice, the angle of incidence of the ray 120 may also be limited by the critical angle(s) for the waveguide assembly 104.

The amount of diffraction at the interface with the extraction grating 122 may vary based on the material of the waveguide assembly 104 (and/or extraction grating 122) and the material on the other side of the interface, as well as the pitch of the extraction grating 122. In one example, the extraction grating 122 is configured such that a ray encountering the extraction grating 122 at an angle of incidence halfway between the critical angle of the waveguide assembly 104 (e.g., 42 degrees in acrylic) and an angle above which any light produced from the backlight unit 100 will not be of much use (e.g., about 72 degrees) produces diffracted components traveling perpendicular to the waveguide assembly 104 (i.e., in the direction of the surface normal). In an acrylic example, the halfway angle is about 57 degrees. With this halfway point, during operation, angles greater than about 57 degrees produce diffracted components that are off-normal in the same sense as the ray propagating through the waveguide assembly 104. Angles less than about 57 degrees produce diffracted components that are off-normal in the opposite sense as the ray propagating through the waveguide assembly 104. The halfway point angle may vary in other examples.

With continued reference to FIGS. 1 and 2, the backlight assembly 100 includes a liquid crystal layer 132 extending along the waveguide assembly 104. In this example, the liquid crystal layer 132 is disposed adjacent to (e.g., contiguous with) the isotropic wedge 112. The liquid crystal layer 132 may alternatively be disposed adjacent to (e.g., contiguous with) the birefringent wedge 114. The liquid crystal layer 132 is configured to selectively switch the polarization of the ray 120 of light as the ray 120 reflectively propagates through the waveguide assembly 104. To that end, the thickness of the liquid crystal layer 132 may be selected such that, when activated, the liquid crystal layer 132 acts as a quarter-wave plate. An exemplary thickness may be about 1.5 microns, but may vary based on material and/or other factors. Each time the ray 120 reflects at the rear face 110 within the area of an activated pixel 134, the ray 120 passes through the liquid crystal layer 132 twice (i.e., before and after reflection). The ray 120 accordingly experiences a half-wave plate. The activated pixel 134 may thus effectively rotate the polarization 90 degrees. To that end, the liquid crystal layer 132 may be oriented or otherwise configured such that the principal axes of the (effective) half-wave plate are offset 45 degrees from the plane of the transmission axis of the linear polarization of the ray 120. If the ray 120 passes through the (effective) half-wave plate, the polarization state of the light is rotated 90 degrees, thereby toggling the polarization of the ray 120 from one state to the other. The liquid crystal layer 132 may thus be used to switch between vertical and horizontal polarization states (or between other orthogonal polarization states). The liquid crystal layer 132 may thus be controlled to, in turn, control the rate at which the angle of incidence of the ray 120 is adjusted during propagation down the waveguide assembly 104.

The liquid crystal layer 132 includes an array of pixels 134 disposed along the length of the waveguide assembly 104. The array of pixels 134 are used to selectively control the extent to which the ray 120 is refracted at the interface 116 along the length of the waveguide assembly 104. The pattern of pixel activation may thus support a variable continuum of backlight illumination convergence.

In the example of FIGS. 1 and 2, six pixels are depicted for ease in illustration. The array may include any number of pixels 134. Each pixel 134 is arranged in the liquid crystal layer 132 to have, as described above, a thickness such that each pixel 134 is configured to act as a quarter-wave plate when activated. Each pixel 134 may thus act as a half-wave plate with the light passing through twice due to reflection. Each pixel 134 is separately controlled to provide the selective polarization switching. Each pixel 134 is activated or not activated to determine whether the polarization state of the ray 120 is toggled or switched in the event that the ray 120 encounters the pixel 134. The ray 120 thus remains in its current polarization state until encountering another activated pixel 134. The polarization of the ray 120 may thus be controlled on a pixel-by-pixel basis.

An example of the selective polarization switching of the pixels is shown in FIG. 2. In this example, only pixels 134A and 134B are activated. The light source 120 is configured to generate linearly polarized in a direction (e.g., horizontal polarization) such that the ray 120 is refracted at the interface 116. The first two reflections of the ray 120 encounter one of the first two pixels 134. Because each of those pixels 134 is not active, the polarization state of the ray 120 remains the same (e.g., horizontal polarization) after each of those reflections. The ray 120 then encounters the pixel 134A. Because the pixel 134A is active, the ray 120 assumes the other polarization state (e.g., vertical polarization) after the reflection. As a result, the ray 120 does not experience a difference in refractive index upon reaching the interface 116, and the ray 120 passes through the interface 116 without refraction. The ray 120 encounters the interface 116 after reflection at the front face 108 again without refraction. The next reflection at the liquid crystal layer 132 toggles the polarization state back to the original state due to the activation of the pixel 134B. The ray 120 is accordingly then refracted at the interface 116.

Further refraction, polarization switching, and reflection may then continue as the ray 120 reflectively propagates down the waveguide assembly 104.

The nature of the offsets between the refractive indices may vary. For example, the single refractive index of the isotropic material of the isotropic wedge 112 may be higher or lower than both of the refractive indices of the birefringent wedge 114. Alternatively, the isotropic refractive index may be higher than one of the birefringent indices, but lower than the other birefringent index.

The positions of the wedges 112, 114 may be switched. The wedges 112, 114 are configured such that the extent to which refraction occurs as the light reflectively propagates down the waveguide assembly 104 is dependent upon the polarization state of the light.

The positions of the extraction grating 122 and the liquid crystal layer 132 may differ from the example of FIGS. 1 and 2. For instance, the extraction grating 122 may be disposed along (e.g., adjacent to, or contiguous with) the liquid crystal layer 132 rather than the birefringent wedge 114. The liquid crystal layer 132 may be disposed along (e.g., adjacent to, or contiguous with) the birefringent wedge 114 rather than the isotropic wedge 112. These alternative configurations may be used with or without changing the positions of the extraction grating 122 and the liquid crystal layer 132 relative to the front and rear faces 108, 110.

In some cases, the backlight assembly 100 is configured as a primary backlight unit for the display. The backlight assembly 100 may thus have a size that corresponds with the entire viewable area of the display. For example, the backlight assembly 100 may be panel-shaped. The end 106 may thus extend along a side or edge of the panel. The front face 108 of the backlight assembly 100 may thus extend over the entire lateral extent of the display. For example, the front face 108 of the backlight assembly 100 may have roughly the same lateral dimensions as the image-forming LCD panel. In those cases, the backlight assembly 100 may include multiple light sources 102 disposed along the end 106.

The shapes of the respective components of the backlight assembly 100, such as the waveguide assembly 104, may vary in accordance with the shape of the backlight assembly 100. For example, if the backlight assembly 100 extends over the entire viewable area of the display, then the waveguide assembly 104 (and the components thereof) and other components of the backlight assembly 100 may be plate- or panel-shaped. Alternatively, the waveguide assembly 104 and other components of the backlight assembly 100 may be elongate or otherwise shaped.

The variability in the convergence provided by the backlight assembly 100 may be sufficient for some displays and/or contexts. For example, the backlight assembly 100 may vary the convergence angles to accommodate a range of focal distances well suited for viewing wall-mounted displays. In such cases, the rays emitted by the backlight assembly 100 may converge at a focal distance ranging from about several feet to about several yards or more. Convergence at closer positions may be obtained by placing a lens (e.g., Fresnel lens) in between the backlight unit 100 and the other components of the display. For example, the lens may be contiguous with or otherwise disposed adjacent to the front face 108. The lens may allow the endpoints of the range of available focal distances may thus be changed. For example, one endpoint will no longer be effectively infinity, as shown in FIG. 1, due to parallel rays, but rather a shorter focal distance in accordance with the focal length of the lens.

Other displays or contexts may warrant further variability in the convergence. For instance, shorter focal distances may be appropriate for viewing displays of handheld and wearable electronic devices, or for viewing laptop computer displays. For example, focal distances for mobile phones may range from about several inches to about one foot. In such cases, the convergence provided by the backlight unit 100 may be amplified or increased by subsequent optical processing. The rays emitted from the backlight unit 100 may thus emerge not into air, but rather into a further optical component or stage of the backlight. The further optical component is configured to amplify the variability in the convergence angles to increase the range of attainable convergence angles. The further optical component may be a holographic or other component.

Figure 3:
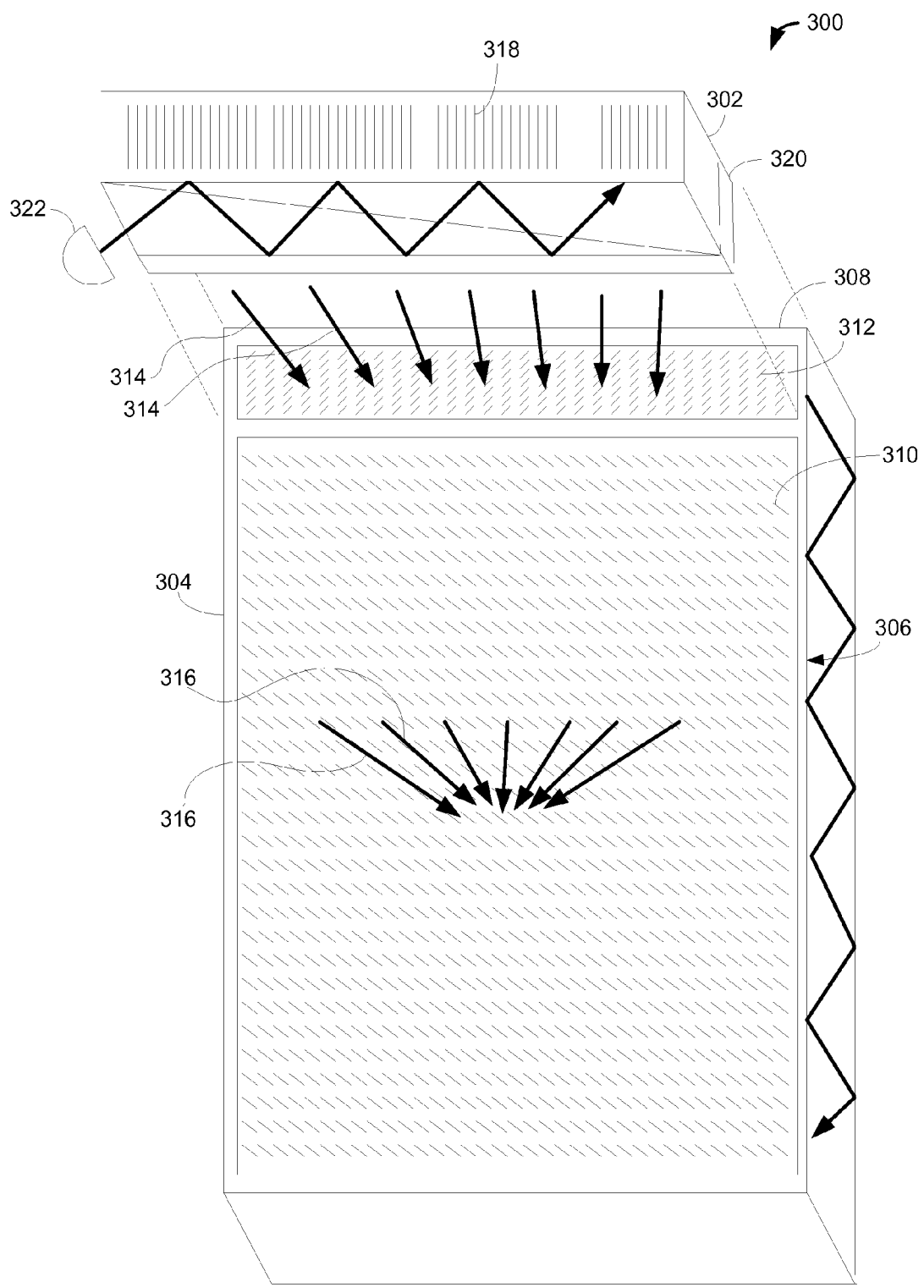
FIG. 3 is a schematic view of another backlight unit configured for variable convergence of backlight illumination in accordance with one example.

FIG. 3 depicts an example in which a backlight unit 300 uses volume holograms to amplify the variability of the convergence. The backlight unit 300 includes an elongate waveguide assembly 302 and a panel or slab waveguide 304 adjacent the waveguide assembly 302. The elongate waveguide assembly 302 may be configured in accordance with the waveguide assembly 104 described in connection with FIG. 1. The waveguide assembly 302 may thus include an isotropic wedge and a birefringent wedge arranged nose-to-tail with the isotropic wedge. The isotropic refractive index of the isotropic wedge and the refractive indices of the birefringent wedge may differ as described above.

In operation, the waveguide assembly 302 injects light into the panel waveguide 304 over a range of emission angles. The panel waveguide 304 includes an arrangement of volume holograms responsive to the emission angles to provide illumination at predetermined angles for convergence at a desired focal distance. The volume holograms are configured to amplify an extent to which the light extracted from the waveguide assembly 302 is converging. The light propagates through the panel waveguide 304 under total internal reflection until encountering one of the volume holograms corresponding to the reflection angle at which the light is propagating.

The panel waveguide 304 may be composed of acrylic, polycarbonate, glass, or other transparent materials. The panel waveguide 304 may be shaped and sized to extend over a viewable area 306 of the display. The waveguide assembly 302 extends across the panel waveguide 304 along an end or edge 308 of the panel waveguide 304. In this example, the waveguide assembly 302 is adjacent a front face of the panel waveguide 304. The positioning of the waveguide assembly 302 may vary. For example, the waveguide assembly 302 may be disposed along a rear face of the panel waveguide 304. An exploded view of the backlight unit 300 is shown in FIG. 3 to better depict the configuration of the panel waveguide 304 and to show the injection of light into the panel waveguide 304.

The elongate waveguide assembly 302 may cover an end region along the edge 308 outside of the viewable display area 306. The elongate waveguide assembly 302 may be narrowly shaped to minimize the size of the end region. For example, the elongate waveguide assembly 302 may have a width of about 1 mm. The width may vary with the overall lateral dimensions of the backlight unit 300. The narrow shape of the waveguide assembly 302 may maximize the area over which the backlight unit 300 provides illumination and, thus, the viewable display area 306. The elongate waveguide assembly 302 may be band- or strip-shaped. The thickness of the elongate waveguide assembly 302 may roughly correspond with the thickness of other components of the display stacked in front of the panel waveguide 304, such as an LCD panel and/or a transparent cover.

The volume hologram arrangement of the panel waveguide 304 includes an array 310 of volume holograms distributed over the viewable display area 306. The panel waveguide 304 also includes a set 312 of turning structures distributed laterally across the slab waveguide in the end region along the edge 308. The elongate waveguide assembly 302 is disposed at the end region such that rays 314 of light extracted at specific emission angles are emitted into the panel waveguide 304 for interaction with the set 312 of turning structures. The set 312 of turning structures redirect the light toward the array 310 of volume holograms at a panel propagation angle based on the emission angle at which the light is injected into the panel waveguide 304. Each volume hologram of the array 310 is configured to emit backlight from the panel waveguide at a convergence angle in accordance with the panel propagation angle and the emission angle.

In the example of FIG. 3, the set 312 of turning structures includes a set 312 of volume holograms responsive to the emission angle. Each volume hologram of the set 312 is activated at only one injection angle (i.e., the emission angle from the elongate waveguide assembly 302). When activated, the volume hologram is configured to redirect the light down the panel waveguide 304 at a unique angle (e.g., a unique angle relative to a normal to the front surface of the panel waveguide 304). In some examples, the set 312 of turning structures may include about 20 or more volume holograms, but other set sizes may be used.

The volume holograms of the array 310 are configured such that only a single volume hologram is activated by light at each unique angle. The activation of one of the volume holograms causes a respective ray 316 of light to be emitted from the panel waveguide 304 at a predetermined angle. The volume holograms of the array 310 may be recorded such that the rays 316 are converging more quickly than the rays 314 emitted from the elongate waveguide assembly 302, but still at convergence angles determined in accordance with the emission angles of the rays 314.

The backlight unit 300 includes a number of other components directed to injecting the rays 314 of light into the panel waveguide 304. The components may be configured similarly to corresponding components described above in connection with FIGS. 1 and 2. For example, an extraction grating 318 may be embossed or otherwise secured or formed on the waveguide assembly 302. The extraction grating 318 is configured to extract light propagating down the waveguide assembly 302 at an emission angle in accordance with the internal reflection angles, as described above. A liquid crystal layer 320 is disposed along the waveguide assembly 302 to control the selective refraction of the light within the waveguide assembly 302, as described above. In the example of FIG. 3, the liquid crystal layer is disposed along the face of the waveguide assembly 302 closest to the panel waveguide 304, while the extraction grating 318 is disposed on the opposite face. The positions may be switched or otherwise differ in other embodiments. Light may be provided to the waveguide assembly 302 by one or more light sources 322 disposed at an end of the waveguide assembly 302.

Figure 4:
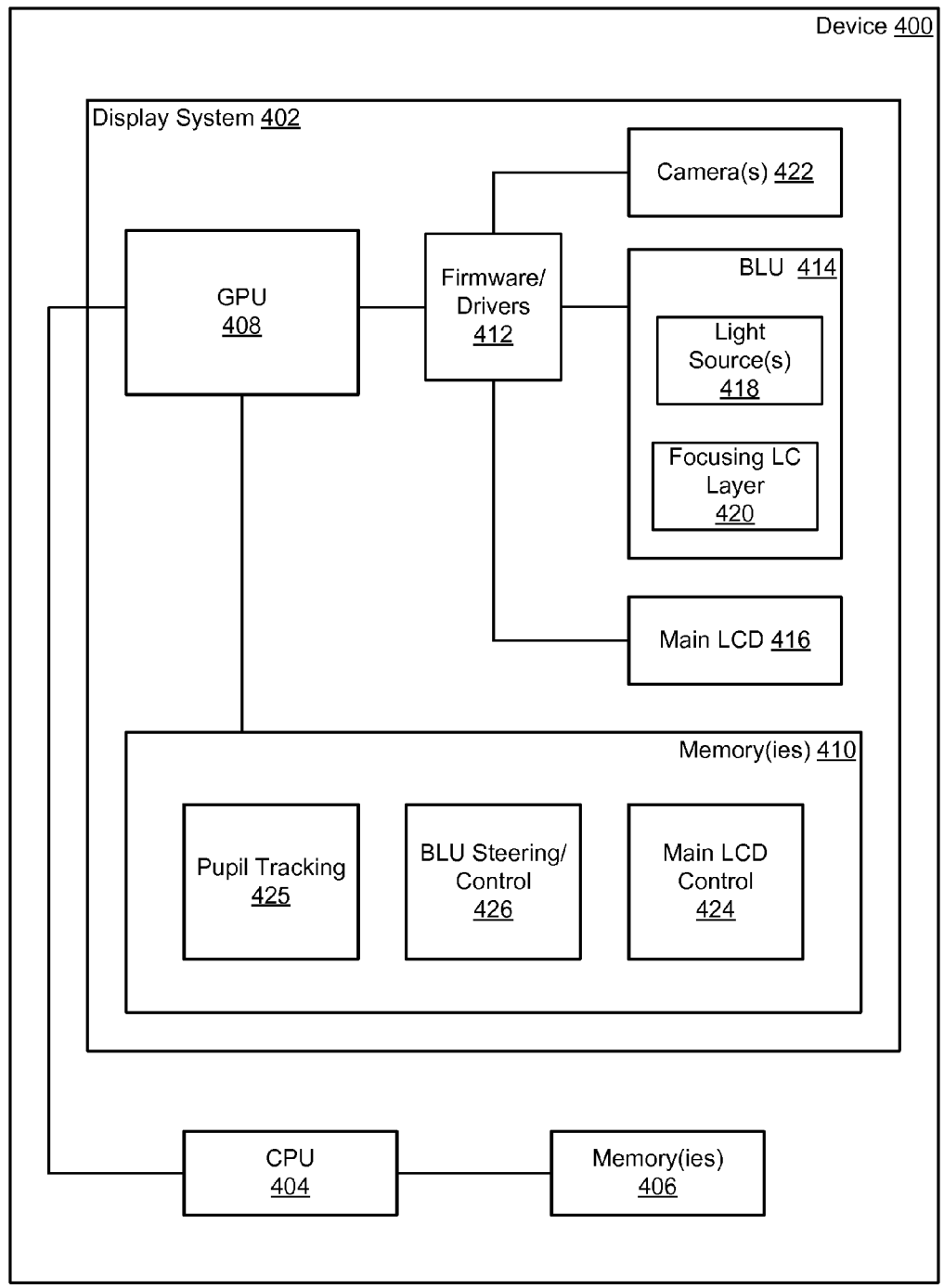
FIG. 4 is a block diagram of an electronic device with a backlight unit configured for variable convergence of backlight illumination in accordance with one example.

FIG. 4 shows an exemplary electronic device 400 with a display system 402 (or subsystem) configured for variable convergence backlighting. The display system 402 may be integrated with other components of the electronic device 400 to a varying extent. The display system 402 may be or include a graphics subsystem of the electronic device 400. Any number of display systems may be included. In this example, the device 400 includes a processor 404 and one or more memories 406 separate from the display system 402. The processor 404 and the memories 406 may be directed to executing one or more applications implemented by the device 400. The display system 402 generates a user interface for an operating environment (e.g., an application environment) supported by the processor 404 and the memories 406. The processor 404 may be a general-purpose processor, such as a central processing unit (CPU), or any other processor or processing unit. Any number of such processors or processing units may be included.

The display system 402 may be communicatively coupled to the processor 404 and/or the memories 406 to support the display of video or other images via the user interface. For example, the processor 404 may provide frame data indicative of each image frame to the display system 402. The frame data may be generated by the processor 404 and/or by another component of the device 400. The frame data may be alternatively or additionally obtained by the processor 404 from the memory 406 and/or another component of the device 400.

In the example of FIG. 4, the display system 402 includes a processor 408, one or more memories 410, firmware and/or drivers 412, a backlight unit (BLU) 414, and an LCD panel 416. The processor 408 may be a graphics processing unit (GPU) or other processor or processing unit dedicated to graphics- or display-related functionality. Some of the components of the display system 402 may be integrated. For example, the processor 408, one or more of the memories 410, and/or the firmware 412 may be integrated as a system-on-a-chip (SoC) or application-specific integrated circuit (ASIC). The display system 402 may include additional, fewer, or alternative components. For example, the display system 402 may not include a dedicated processor, and instead rely on the CPU or other processor 404 that supports the remainder of the electronic device 400. The display system 402 may not include the memory (or memories) 410, and instead use the memories 406 to support display-related processing. In some cases, instructions implemented by, and data generated or used by, the processor 408 of the display system 402 may be stored in some combination of the memories 406 and the memories 410.

The backlight unit 414 may be configured for variable convergence backlighting as described above. In addition to the waveguide-related components, the backlight unit 414 includes one or more light sources 418 and a liquid crystal layer 420 to selectively switch the polarization state of the guided rays, as described above. The light sources 418 and the liquid crystal layer 420 may be controlled by the processor 408 via, for example, the firmware or drivers 412. The light sources 418 are controlled to adjust the directionality of the backlighting, while the pixels of the liquid crystal layer 420 are controlled to adjust the focus distance, or convergence, of the backlighting.

The liquid crystal layer 420 of the backlight unit 414 is distinguished from the LCD panel 416. The LCD panel 416 is controlled and configured to form images in accordance with the frame data provided by, for instance, the processor 404. The LCD panel 416 is disposed to receive the illumination from the backlight unit 414. In contrast, the liquid crystal layer 420 is controlled to vary the extent to which the illumination provided by the backlight unit 414 converges. The liquid crystal layer 420 may thus be referred to as a focusing (or focus adjustment) liquid crystal layer. The extent to which the liquid crystal layer 420 adjusts the focus distance or convergence of the backlight illumination is dependent upon the position of the viewer (or pupils of the viewer) rather than the image content represented by the frame data.

The display system 402 includes one or more cameras 422 for pupil tracking. Each camera 422 is oriented toward the viewer of the display. For example, when the electronic device 400 is a laptop computer, the camera(s) 422 may include one or more rear-facing cameras positioned along a display bezel. In some cases, the camera(s) 422 include one or more depth cameras and/or one or more color cameras. The configuration of the camera(s) 422 may vary. The camera data captured by the display system 402 may be directly or indirectly indicative of pupil position. For example, the camera data may be processed to resolve one or more various features of the viewer's eye, such as the center of the pupil, the outline of the pupil, the position of the iris, and/or one or more specular glints from the cornea. The location data for one or more of these features may be used as input parameters of a model, e.g., a polynomial model, that provides pupil coordinates in a reference frame relative to the display system 402.

The LCD panel 416, the light source(s) 418, the focusing liquid crystal layer 420, the cameras 422 may be controlled by the processor 408. The processor 408 may provide such control in accordance with a number of instruction sets stored in the memories 410. In this example, instruction sets 424-426 are provided for main LCD panel control, pupil tracking, and backlight unit (BLU) illumination control, respectively. The instruction set 424 may direct the processor 408 to drive the LCD panel 416 in accordance with the frame data. The instruction set 425 may direct the processor 408 to determine and track the position of viewer pupils. The pupil position data is then used by the processor 408 to adjust the directionality (steering) and convergence (focus) of the backlight illumination set 424 in accordance with the instruction set 426.

The pupil tracking instructions 425 may configure the processor 408 and, thus, the display system 402, to acquire a time-resolved sequence of depth maps. The term 'depth map' refers to an array of pixels registered to corresponding regions of an imaged subject, with a depth value indicating, for each pixel, the depth of the corresponding region. 'Depth' is defined as the coordinate orthogonal to the plane of the backlight unit 414, which increases with increasing distance from the cameras 418. In some cases, the display system 402 may be configured to acquire two-dimensional image data from which a depth map is obtained via downstream processing.

Other pupil tracking techniques may be used. For example, brightness or color data from two, stereoscopically oriented cameras 418 may be co-registered and used to construct a depth map. In other cases, a depth camera may be configured to project onto the subject a structured infrared (IR) or near-IR (NIR) illumination pattern having numerous discrete features, such as lines or dots. An imaging array in the depth camera 418 may be configured to image the structured illumination reflected back from the viewer. A depth map of the viewer may be constructed based on the spacing between adjacent features in the various regions of the imaged subject. In still other cases, the depth camera may project a pulsed illumination toward the viewer. A pair of imaging arrays may be configured to detect the pulsed illumination reflected back from the viewer. Both arrays may include an electronic shutter synchronized to the pulsed illumination, but the integration times for the arrays may differ, such that a pixel-resolved time-of-flight (TOF) of the pulsed illumination, from the illumination source to the viewer and then to the arrays, is discernible based on the relative amounts of light received in corresponding elements of the arrays. A TOF depth-sensing camera 418 that measures the phase shift between transmitted and reflected light may also be used.

The LCD drive instructions 424, the pupil tracking instructions 425, and the backlight illumination control instructions 426 may be arranged in discrete software modules or instruction sets in the memories 410. Alternatively, two or more of the instructions or definitions 424-426 may be integrated to any desired extent. The instructions or definitions 424-426 may alternatively or additionally be integrated with other instructions, definitions, or specifications stored in the memories 410. Additional instructions, modules, or instruction sets may be included. For instance, one or more instruction sets may be included for processing touch inputs in cases in which the display system 402 includes a touchscreen or other touch-sensitive surface.

The processing of the camera data and other aspects of the variable backlighting techniques may be implemented by any combination of the processor 404, the processor 408, and/or one or more other processor(s), which may be collectively referred to as a processor. In other examples, the device 400 includes a single processor (i.e., either the processor 404, the processor 408, or a different processor) for purposes of processing the frame data, the camera data, and other data involved in controlling the display system 402.

Figure 5:
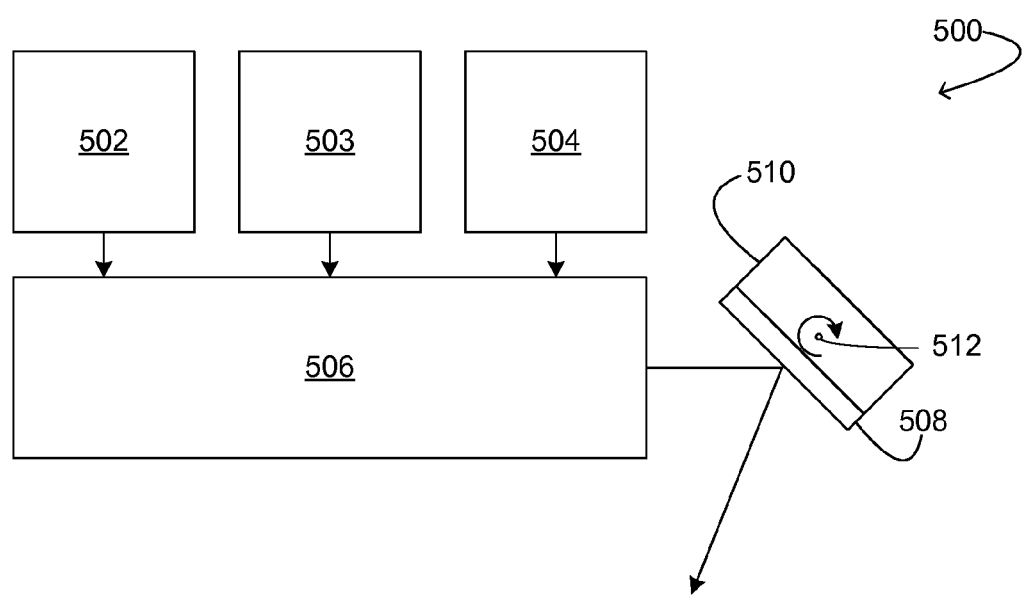
FIG. 5 is a schematic view of a light source of a backlight unit in accordance with one example.

FIG. 5 depicts an exemplary light source 500 for use in connection with the backlight units described herein. The light source 500 is configured for adjustment of the angle at which the light is injected into the waveguide assembly to which the light source 500 is adjacent, such as the waveguide assembly 104 of FIG. 1 or the waveguide assembly 302 of FIG. 3. The injection angle determines the initial angle at which the guided rays encounter the extraction grating (e.g., the extraction grating 108 of FIG. 1) and, thus, the emission angle. The initial angle may be determinative of the general direction in which the light is emitted from the waveguide assembly without any convergence, as shown, for example, in FIG. 1. Subsequent adjustment of the reflection angles may then be used to adjust the extent to which the emitted rays converge, as described above.

The light source 500 is configured to inject collimated (or substantially collimated) light into the waveguide assembly. The light source 500 may include or be configured as a laser. In the example of FIG. 5, the light source 500 includes independently biased red, green, and blue lasers 502-504. Each laser 502-504 may be a diode laser. In other examples, a single laser is used. In still other examples, LED or other light emitting devices are used. Thus, in some cases, the light source 500 may include a polarizer. The light may or may not be coherent. In this example, the light is passed through an expander 506. The expander 506 may be used to combine the beams from the individual lasers 502-504. In other cases, the light source 500 does not include an expander.

The output from the expander 506 is directed to a mirror 508, which is coupled to a piezoelectric mirror mount 510. In this example, a control voltage applied to a piezoelectric element of the mirror mount 510 proportionally rotates the mirror 508 about an axis 512. The rotation of the mirror 508 may be used to control the injection angle. In other examples, the mirror mount 510 may include two piezoelectric elements to control the deflection of the mirror in two, orthogonal directions. In still other cases, the laser light may be deflected in orthogonal directions by two different mirrors, each coupled to its own piezoelectric mirror mount. Non-piezoelectric mechanical transducers may alternatively be used. Non-mechanical transducers may also be used, such as an electronically tunable optic configured to deflect the laser light by a controllable amount. Other micro-electromechanical devices may be used to implement the mirror 508 and mirror mount 510.

Figure 6:
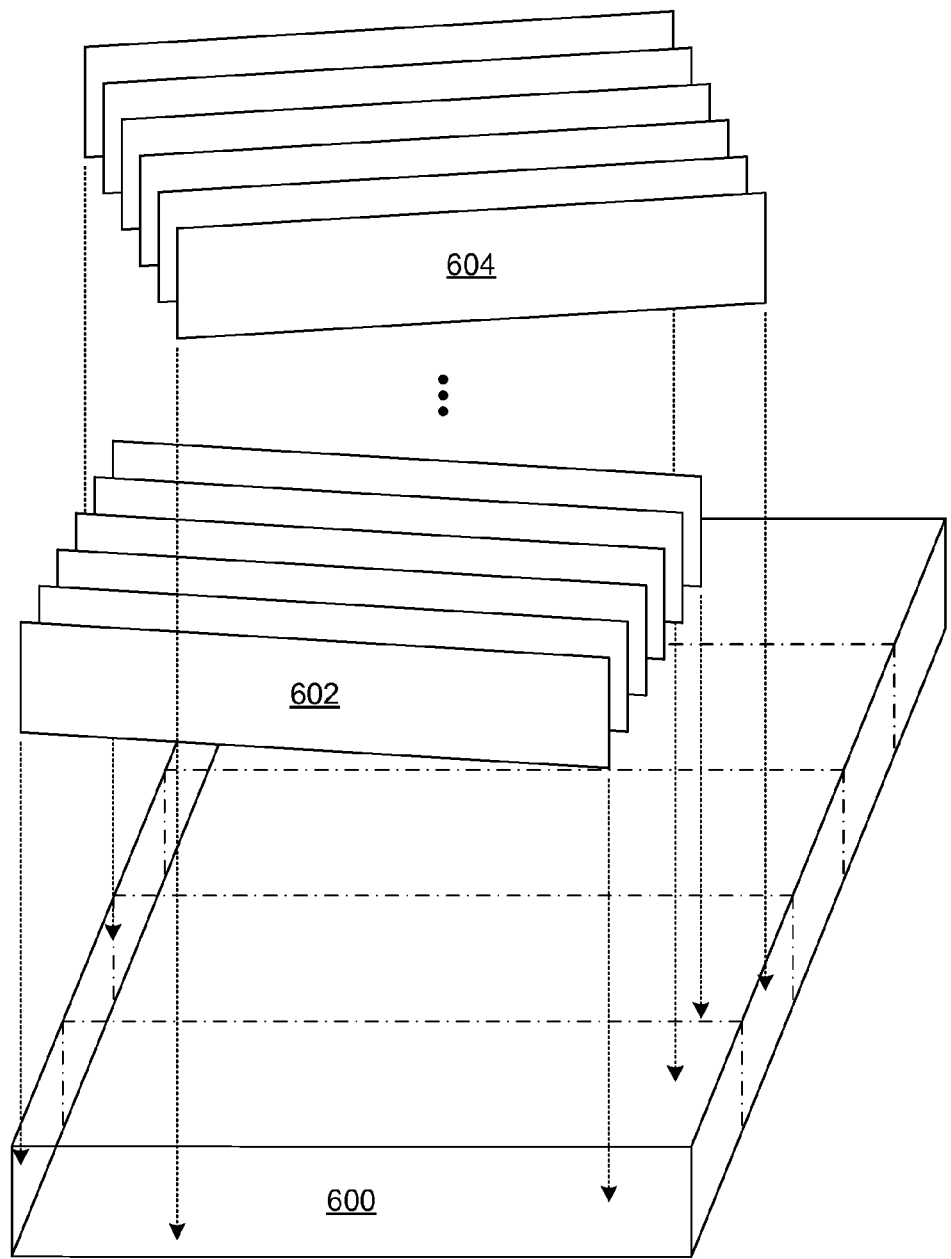
FIG. 6 is a schematic, perspective view of a volume hologram arrangement of a backlight unit in accordance with one example.

FIG. 6 depicts an exemplary volume hologram arrangement in a panel waveguide 600. The panel waveguide 600 may be used in the backlight unit 300 of FIG. 3. A similar arrangement may be used to provide the set 312 of turning structures shown in FIG. 3. In this example, each volume hologram is established via a respective Bragg grating 602, 604. The Bragg gratings may be superimposed over the lateral extent of the panel waveguide 600. Only two Bragg gratings are shown for ease in illustration. In practice, the panel waveguide 600 may have a much higher total number of Bragg gratings (or other volume holograms), such as about 20 or more volume holograms. Each Bragg grating 602, 604 provides a volume hologram for a respective range of angles. Because each Bragg grating is excited by a very narrow range of angles (e.g., about 1 degree), a large number of Bragg gratings (e.g., over 100) are superimposed within the panel waveguide to cover the entire range of possible angles (e.g., plus or minus about 60 degrees). The thickness of the Bragg gratings 602, 604 may fall in a range from about 10 microns to about 100 microns, but other thicknesses may be used. The Bragg gratings 602, 604 may vary with respect to orientation and pitch.

The respective excitation angles of each Bragg grating 602, 604 are determined by the orientation and wavelength of the light used to record the Bragg grating. Outside the appropriate wavelength band or range of incidence angles, the Bragg grating is transparent. This characteristic allows numerous Bragg gratings to occupy the same space within the panel waveguide 600 and nonetheless operate independently of each other. The Bragg gratings 602, 604 may thus extend the entire area of the panel waveguide 600 and, are instead partially shown in FIG. 6 for ease in illustration.

Each Bragg grating 602, 604 or other volume hologram may be configured, when excited, to diffract a portion of the light propagating through the panel waveguide 600 and to eject such light in a predetermined, different direction, which is selectable based on the manner in which the hologram is recorded. As shown in FIG. 3, the useful directions lie in horizontal planes orthogonal to the plane of backlight unit 300 and span a range of horizontal-plane angles. During the recording process, each angle is mapped to light of a different reflection angle within the panel waveguide 600, which may range from the critical angle (42 degrees in polyacrylic) to a glancing angle of 5 degrees or less. Due to the action of the Bragg gratings 602, 604, the injection angle at which light is injected into the panel waveguide 600 influences a reflection angle at which the injected light reflects from the front and back faces during propagation through the panel waveguide 600. The superposition of the Bragg gratings 602, 604 transforms the angle of injection into the waveguide to an orthogonal emission angle out of the backlight unit.

Figure 7:
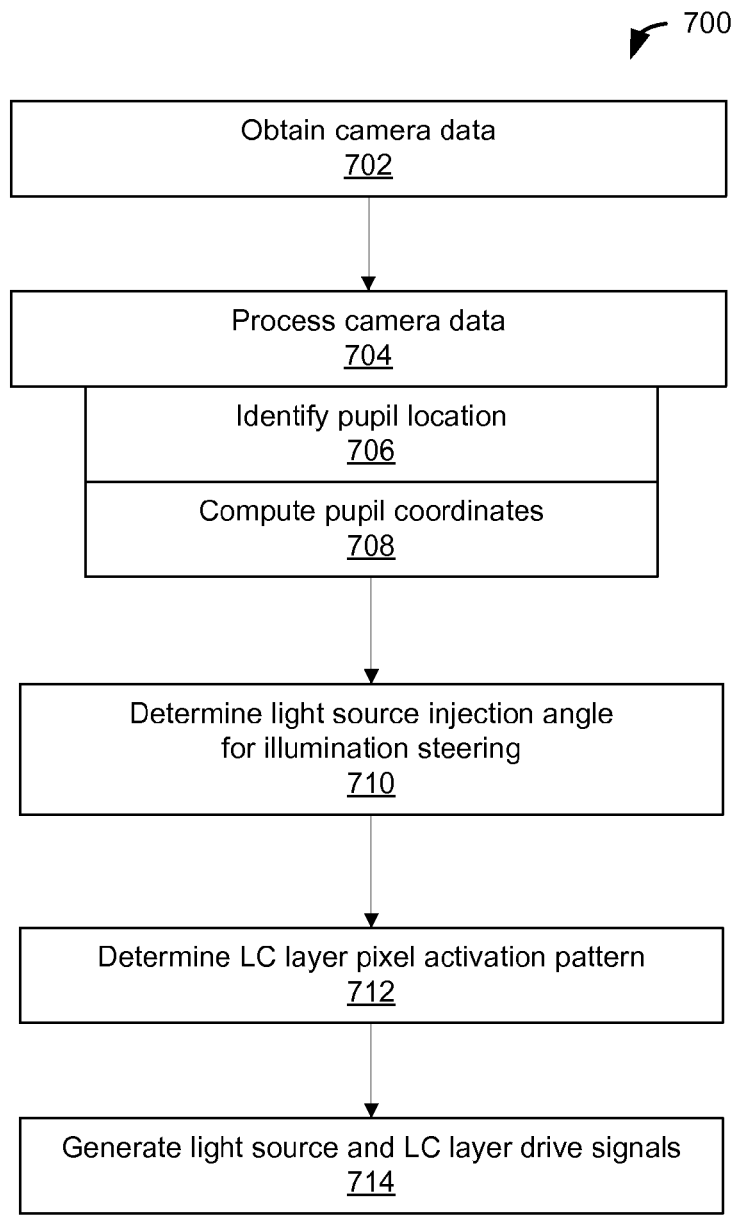
FIG. 7 is a flow diagram of a computer-implemented method of operating an electronic device having a backlight unit with variable convergence of backlight illumination in accordance with one example.

FIG. 7 depicts an exemplary process for varying backlight illumination convergence. The method 700 is computer-implemented. For example, one or more computers of the electronic device 100 shown in FIG. 1 and/or another electronic device may be configured to implement the method or a portion thereof. The implementation of each act may be directed by respective computer-readable instructions executed by the processor 408 (FIG. 4) of the display system 402 (FIG. 4), the processor 404 (FIG. 4) of the device 400, and/or another processor or processing system. Additional, fewer, or alternative acts may be included in the method 700. For example, the method 700 may include one or more acts directed to determining whether steering and/or convergence is possible given the current pupil location.

The method 700 may be implemented concurrently with other display system control procedures, including, for instance, the processing of frame data to generate LCD drive signals. The method 700 may be implemented to update the backlight illumination parameters at a rate different than the other procedures. For example, the method 400 may be implemented much less frequently than the frame update rate.

A lower update rate for the backlight illumination parameters may be sufficient because pupil location does not change that abruptly.

The method 700 may begin with one or more acts related to controlling one or more cameras to capture data indicative of the viewer of the display. Camera data is received or otherwise obtained in act 702. The camera data may be received from multiple cameras, including, for instance, an infrared or other depth camera. The nature of the camera data may vary as described above.

The camera data is processed in act 704. In some cases, the act 704 includes identification of pupils in act 706 and calculation of pupil coordinates in act 708. The remainder of the method 700 may then be implemented for each identified pupil. For example, the method 700 may then be repeated, e.g., in a processing loop, for each identified pupil.

Once the location of the viewer's eyes is known, the lateral position data is used to determine light source injection angles in act 710. The light source injection angle is selected to steer the focal point of the backlight illumination. For example, the backlight illumination may be steered left to right.

In act 712, a liquid crystal layer activation pattern is determined based on the depth of the pupil position. Pixels of the liquid crystal layer are selectively activated to control the extent to which the illumination converges.

Drive signals are then generated for the backlight unit in act 714 in accordance with the parameters determined in the acts 710 and 712. For example, drive signals for the light source and the liquid crystal layer are generated.

The order of the acts of the method may vary from the example shown. For example, in some cases, the acts are implemented in parallel or concurrently, such as while processing data in connection with multiple pupil locations. As another example, the liquid crystal layer pattern may be determined before or concurrently with the determination of the light source injection angle.

Figure 8:
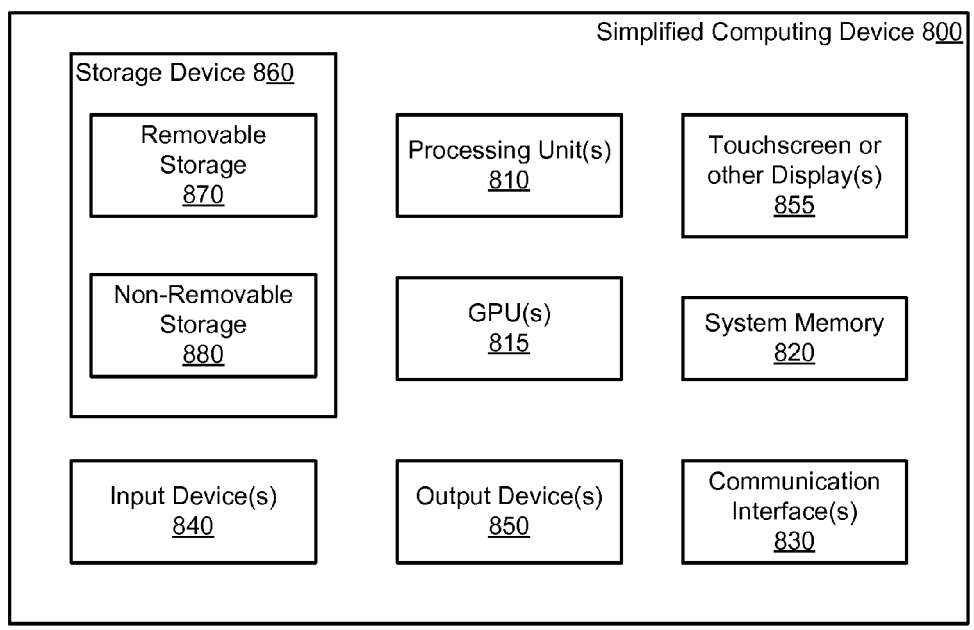
FIG. 8 is a block diagram of a computing environment in accordance with one example for implementation of the disclosed methods, devices, and systems, or one or more components or aspects thereof.

With reference to FIG. 8, an exemplary computing environment 800 may be used to implement one or more aspects or elements of the above-described methods and/or systems and/or devices. The computing environment 800 may be used by, incorporated into, or correspond with, the electronic device 400 (FIG. 4) or one or more elements thereof. For example, the computing environment 800 may be used to implement one or more elements of the electronic device 400. In some cases, the display system 402 (FIG. 4) may be incorporated into the computing environment 800.

The computing environment 800 may be a general-purpose computer system or graphics- or display-based subsystem used to implement one or more of the acts described in connection with FIG. 7. The computing environment 800 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, audio or video media players, and wearable computers such as wrist-worn devices or head-mount devices.

The computing environment 800 has sufficient computational capability and system memory to enable basic computational operations. In this example, the computing environment 800 includes one or more processing unit(s) 810, which may be individually or collectively referred to herein as a processor. The computing environment 800 may also include one or more graphics processing units (GPUs) 815. The processor 810 and/or the GPU 815 may include integrated memory and/or be in communication with system memory 820. The processor 810 and/or the GPU 815 may be a specialized microprocessor, such as a digital signal processor (DSP), a very long instruction word (VLIW) processor, or other microcontroller, or may be a general purpose central processing unit (CPU) having one or more processing cores. The processor 810, the GPU 815, the system memory 820, and/or any other components of the computing environment 800 may be packaged or otherwise integrated as a system on a chip (SoC), application-specific integrated circuit (ASIC), or other integrated circuit or system.

The computing environment 800 may also include other components, such as, for example, a communications interface 830. One or more computer input devices 840 (e.g., pointing devices, keyboards, audio input devices, video input devices, haptic input devices, devices for receiving wired or wireless data transmissions, etc.) may be provided. The input devices 840 may include one or more touch-sensitive surfaces, such as track pads. Various output devices 850, including touchscreen or touch-sensitive display(s) 855, may also be provided. The output devices 850 may include a variety of different audio output devices, video output devices, and/or devices for transmitting wired or wireless data transmissions.

The computing environment 800 may also include a variety of computer readable media for storage of information such as computer-readable or computer-executable instructions, data structures, program modules, or other data. Computer readable media may be any available media accessible via storage devices 860 and includes both volatile and nonvolatile media, whether in removable storage 870 and/or non-removable storage 880.

Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 800.

The localized backlighting techniques described herein may be implemented in computer-executable instructions, such as program modules, being executed by the computing environment 800. Program modules include routines, programs, objects, components, data structures, etc., that perform particular tasks or implement particular abstract data types. The techniques described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

The techniques may be implemented, in part or in whole, as hardware logic circuits or components, which may or may not include a processor. The hardware logic components may be configured as Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and/or other hardware logic circuits.

The technology described herein is operational with numerous other general purpose or special purpose computing system environments or configurations. Examples of well-known computing systems, environments, and/or configurations that may be suitable for use with the technology herein include, but are not limited to, personal computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

In one aspect, a backlight unit includes a waveguide assembly including a first wedge and a birefringent wedge disposed adjacent to, and arranged nose-to-tail with, the first wedge, to define an interface of the waveguide assembly. The birefringent wedge has different indices of refraction for light propagating through the waveguide assembly in first and second polarization states. The first wedge is configured to propagate the light in the second polarization state at a different speed than the birefringent wedge. The backlight unit further includes a liquid crystal layer extending along the waveguide assembly and configured to selectively switch the light between the first and second polarization states. The backlight unit still further includes an extraction grating extending laterally along the waveguide assembly and configured to extract the light from the waveguide assembly at an emission angle established in accordance with an angle of incidence of the light on the extraction grating. The angle of incidence is determined by an extent to which the light encountered the interface while propagating through the waveguide assembly in the second polarization state.

The liquid crystal layer may include a plurality of pixels arranged in a layer having a thickness such that each pixel is configured as a quarter-wave plate when activated.

The first wedge may include an isotropic material or a birefringent material. In the latter case, the first wedge and the birefringent wedge may have first and second axes of birefringence, respectively. The first and second axes of birefringence may be orthogonal to one another.

In some cases, the backlight unit further includes a panel waveguide disposed adjacent to the waveguide assembly, extending over a viewable display area, and including a plurality of volume holograms responsive to the emission angle at which the light is extracted from the waveguide assembly to determine a further emission angle at which the light is emitted from the panel waveguide. The plurality of volume holograms may be configured to amplify an extent to which the light extracted from the waveguide assembly is converging. Alternatively or additionally, the plurality of volume holograms may include an array of volume holograms distributed over a viewable display area. Alternatively or additionally, the waveguide assembly may be disposed at an end region of the panel waveguide outside of the viewable display area. Alternatively or additionally, the panel waveguide may include a set of volume holograms distributed laterally across the panel waveguide in the end region, in which case the waveguide assembly may be disposed at the end region such that the light extracted at the emission angle is emitted into the panel waveguide for interaction with the set of volume holograms. The set of volume holograms may redirect the light toward the array of volume holograms at a panel propagation angle based on the emission angle at which the light is injected into the panel waveguide. Each volume hologram of the array may be configured to emit backlight from the panel waveguide at a convergence angle in accordance with the panel propagation angle and the emission angle.

In one aspect, a display includes a backlight unit, a liquid crystal layer, an extraction grating, a liquid crystal display (LCD) assembly, a camera, and a processor. The backlight unit includes a light source, a waveguide assembly disposed adjacent the light source to receive light from the light source and including a first wedge and a birefringent wedge disposed adjacent to, and arranged nose-to-tail with, the first wedge, to define an interface of the waveguide assembly. The birefringent wedge has different indices of refraction for light propagating through the waveguide assembly in first and second polarization states. The first wedge is configured to propagate the light in the second polarization state at a different speed than the birefringent wedge. The liquid crystal layer extends along the waveguide assembly and is configured to selectively switch the light between the first and second polarization states as the light reflectively propagates through the waveguide assembly. The extraction grating extends laterally along the waveguide assembly and is configured to extract the light from the waveguide assembly at emission angles established in accordance with respective angles of incidence of the light on the extraction grating determined by an extent to which the light encountered the interface while propagating through the waveguide assembly in the second polarization state. The LCD assembly is configured to form images and is disposed relative to the backlight unit for illumination by the light extracted from the waveguide assembly. The camera is configured to capture camera data of a viewer of the display. The processor is coupled to the camera to determine, based on the camera data, data indicative of pupil location for the viewer. The processor is further coupled to the backlight unit to, based on the data indicative of the pupil location, control an angle at which the light source injects the light into the waveguide assembly to adjust directionality of the illumination provided by the backlight unit, and selectively activate pixels of the liquid crystal layer to adjust convergence of the illumination. In some cases, the backlight unit further includes a panel waveguide as described above.

In one aspect, a display includes a backlight unit and a processor coupled to the backlight unit. The backlight unit includes a light source, an elongate waveguide assembly having an end disposed adjacent the light source to receive light from the light source, a panel waveguide adjacent the elongate waveguide assembly, extending across an entire viewable area of the display, having an edge along which the elongate waveguide assembly extends laterally across the panel waveguide, and through which illumination from the backlight unit is provided, a liquid crystal layer extending along the elongate waveguide assembly and configured to selectively switch the light between first and second polarization states as the light reflectively propagates through the waveguide assembly, and an extraction grating extending laterally along the elongate waveguide assembly and configured to extract the light from the elongate waveguide assembly. The elongate waveguide assembly includes a first wedge and a birefringent wedge disposed adjacent to, and arranged nose-to-tail with, the first wedge, to define an interface of the waveguide assembly. The birefringent wedge has different indices of refraction for light propagating through the waveguide assembly in first and second polarization states. The first wedge is configured to propagate the light in the second polarization state at a different speed than the birefringent wedge. The extraction grating extracts the light at emission angles established in accordance with respective angles of incidence of the light on the extraction grating determined by an extent to which the light encountered the interface while propagating through the elongate waveguide assembly in the second polarization state. The processor is configured to control an angle at which the light source injects the light into the elongate waveguide assembly to adjust directionality of illumination provided by the backlight unit, and selectively activate pixels of the liquid crystal layer to adjust convergence of the illumination. The panel waveguide includes a plurality of volume holograms responsive to the emission angles at which the light is extracted from the elongate waveguide assembly to determine further emission angles at which the illumination is emitted from the panel waveguide. In some cases, the elongate waveguide is disposed along a front face of the panel waveguide or along a rear face of the panel waveguide.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A backlight unit comprising:
a waveguide assembly comprising a first wedge and a birefringent wedge disposed adjacent to, and arranged nose-to-tail with, the first wedge, to define an interface of the waveguide assembly, wherein:
the birefringent wedge has different indices of refraction for light propagating through the waveguide assembly in first and second polarization states; and
the first wedge is configured to propagate the light in the second polarization state at a different speed than the birefringent wedge;
a liquid crystal layer extending along the waveguide assembly, the liquid crystal layer being configured to selectively switch the light between the first and second polarization states; and
an extraction grating extending laterally along the waveguide assembly, the extraction grating being configured to extract the light from the waveguide assembly at an emission angle established in accordance with an angle of incidence of the light on the extraction grating, the angle of incidence being determined by an extent to which the light encountered the interface while propagating through the waveguide assembly in the second polarization state.

2. The backlight unit of claim 1, wherein the liquid crystal layer comprises a plurality of pixels arranged in a layer having a thickness such that each pixel is configured as a quarter-wave plate when activated.

3. The backlight unit of claim 1, wherein the first wedge comprises an isotropic material.

4. The backlight unit of claim 1, wherein:
the first wedge comprises a birefringent material;
the first wedge and the birefringent wedge have first and second axes of birefringence, respectively; and
the first and second axes of birefringence are orthogonal to one another.

5. The backlight unit of claim 1, wherein both of the refractive indices of the birefringent wedge are offset from a refractive index of the first wedge.

6. The backlight unit of claim 1, wherein one of the refractive indices of the birefringent wedge is about equal to a refractive index of the first wedge.

7. The backlight unit of claim 1, further comprising a panel waveguide disposed adjacent to the waveguide assembly, extending over a viewable display area, and comprising a plurality of volume holograms responsive to the emission angle at which the light is extracted from the waveguide assembly to determine a further emission angle at which the light is emitted from the panel waveguide.

8. The backlight unit of claim 7, wherein the plurality of volume holograms are configured to amplify an extent to which the light extracted from the waveguide assembly is converging.

9. The backlight unit of claim 7, wherein the plurality of volume holograms comprises an array of volume holograms distributed over a viewable display area.

10. The backlight unit of claim 7, wherein the waveguide assembly is disposed at an end region of the panel waveguide outside of the viewable display area.

11. The backlight unit of claim 10, wherein:
the panel waveguide comprises a set of volume holograms distributed laterally across the panel waveguide in the end region; and
the waveguide assembly is disposed at the end region such that the light extracted at the emission angle is emitted into the panel waveguide for interaction with the set of volume holograms;
the set of volume holograms redirect the light toward the array of volume holograms at a panel propagation angle based on the emission angle at which the light is injected into the panel waveguide; and
each volume hologram of the array is configured to emit backlight from the panel waveguide at a convergence angle in accordance with the panel propagation angle and the emission angle.

12. A display comprising:
a backlight unit comprising:
a light source;
a waveguide assembly disposed adjacent the light source to receive light from the light source and comprising a first wedge and a birefringent wedge disposed adjacent to, and arranged nose-to-tail with, the first wedge, to define an interface of the waveguide assembly, wherein:
the birefringent wedge has different indices of refraction for light propagating through the waveguide assembly in first and second polarization states; and
the first wedge is configured to propagate the light in the second polarization state at a different speed than the birefringent wedge;
a liquid crystal layer extending along the waveguide assembly, the liquid crystal layer being configured to selectively switch the light between the first and second polarization states as the light reflectively propagates through the waveguide assembly;

an extraction grating extending laterally along the waveguide assembly, the extraction grating being configured to extract the light from the waveguide assembly at emission angles established in accordance with respective angles of incidence of the light on the extraction grating determined by an extent to which the light encountered the interface while propagating through the waveguide assembly in the second polarization state;

a liquid crystal display (LCD) assembly configured to form images, the LCD assembly being disposed relative to the backlight unit for illumination by the light extracted from the waveguide assembly;

a camera to capture camera data of a viewer of the display; and a processor coupled to the camera to determine, based on the camera data, data indicative of pupil location for the viewer;

wherein the processor is further coupled to the backlight unit to, based on the data indicative of the pupil location, control an angle at which the light source injects the light into the waveguide assembly to adjust directionality of the illumination provided by the backlight unit, and selectively activate pixels of the liquid crystal layer to adjust convergence of the illumination.

13. The display of claim 12, wherein the backlight unit further comprises a panel waveguide disposed adjacent to the waveguide assembly, extending across a viewable area of the display, through which the illumination is provided, and comprising a plurality of volume holograms responsive to the emission angle at which the light is extracted from the waveguide assembly to determine further emission angles at which the illumination is emitted from the panel waveguide.

14. The display of claim 13, wherein the plurality of volume holograms are configured to amplify an extent to which the light extracted from the waveguide assembly is converging.

15. The display of claim 13, wherein the plurality of volume holograms comprises an array of volume holograms distributed across a viewable display area.

16. The display of claim 13, wherein the waveguide assembly is disposed at an end region of the panel waveguide outside of the viewable display area.

17. The display of claim 16, wherein:
the panel waveguide comprises a set of volume holograms distributed laterally across the panel waveguide in the end region; and
the waveguide assembly is disposed at the end region such that the light extracted at the emission angle is emitted into the panel waveguide for interaction with the set of volume holograms;
the set of volume holograms redirect the light toward the array of volume holograms at a panel propagation angle based on the emission angle at which the light is injected into the panel waveguide; and
the array of volume holograms is configured to emit backlight from the panel waveguide at a convergence angle in accordance with the emission angle.

18. The display of claim 12, wherein:
the first wedge comprises a birefringent material;
the first wedge and the birefringent wedge have first and second axes of birefringence, respectively; and
the first and second axes of birefringence are orthogonal to one another.

19. A display comprising:
a backlight unit comprising:
a light source;
an elongate waveguide assembly having an end disposed adjacent the light source to receive light from the light source;
a panel waveguide adjacent the elongate waveguide assembly, extending across an entire viewable area of the display, having an edge along which the elongate waveguide assembly extends laterally across the panel waveguide, and through which illumination from the backlight unit is provided;
a liquid crystal layer extending along the elongate waveguide assembly, the liquid crystal layer being configured to selectively switch the light between first and second polarization states as the light reflectively propagates through the waveguide assembly; and
an extraction grating extending laterally along the elongate waveguide assembly, the extraction grating being configured to extract the light from the elongate waveguide assembly;
wherein:
the elongate waveguide assembly comprises a first wedge and a birefringent wedge disposed adjacent to, and arranged nose-to-tail with, the first wedge, to define an interface of the waveguide assembly;
the birefringent wedge has different indices of refraction for light propagating through the waveguide assembly in first and second polarization states; and
the first wedge is configured to propagate the light in the second polarization state at a different speed than the birefringent wedge;
the extraction grating extracts the light at emission angles established in accordance with respective angles of incidence of the light on the extraction grating determined by an extent to which the light encountered the interface while propagating through the elongate waveguide assembly in the second polarization state;
a processor coupled to the backlight unit to control an angle at which the light source injects the light into the elongate waveguide assembly to adjust directionality of illumination provided by the backlight unit, the processor being configured to selectively activate pixels of the liquid crystal layer to adjust convergence of the illumination;
wherein the panel waveguide comprises a plurality of volume holograms responsive to the emission angles at which the light is extracted from the elongate waveguide assembly to determine further emission angles at which the illumination is emitted from the panel waveguide.

20. The display of claim 19, wherein the elongate waveguide is disposed along a front face of the panel waveguide or along a rear face of the panel waveguide.

* * * * *